Jan. 14, 1969     D. D. PATTERSON     3,421,774
BABY STROLLERS
Filed Dec. 5, 1966     Sheet 1 of 6
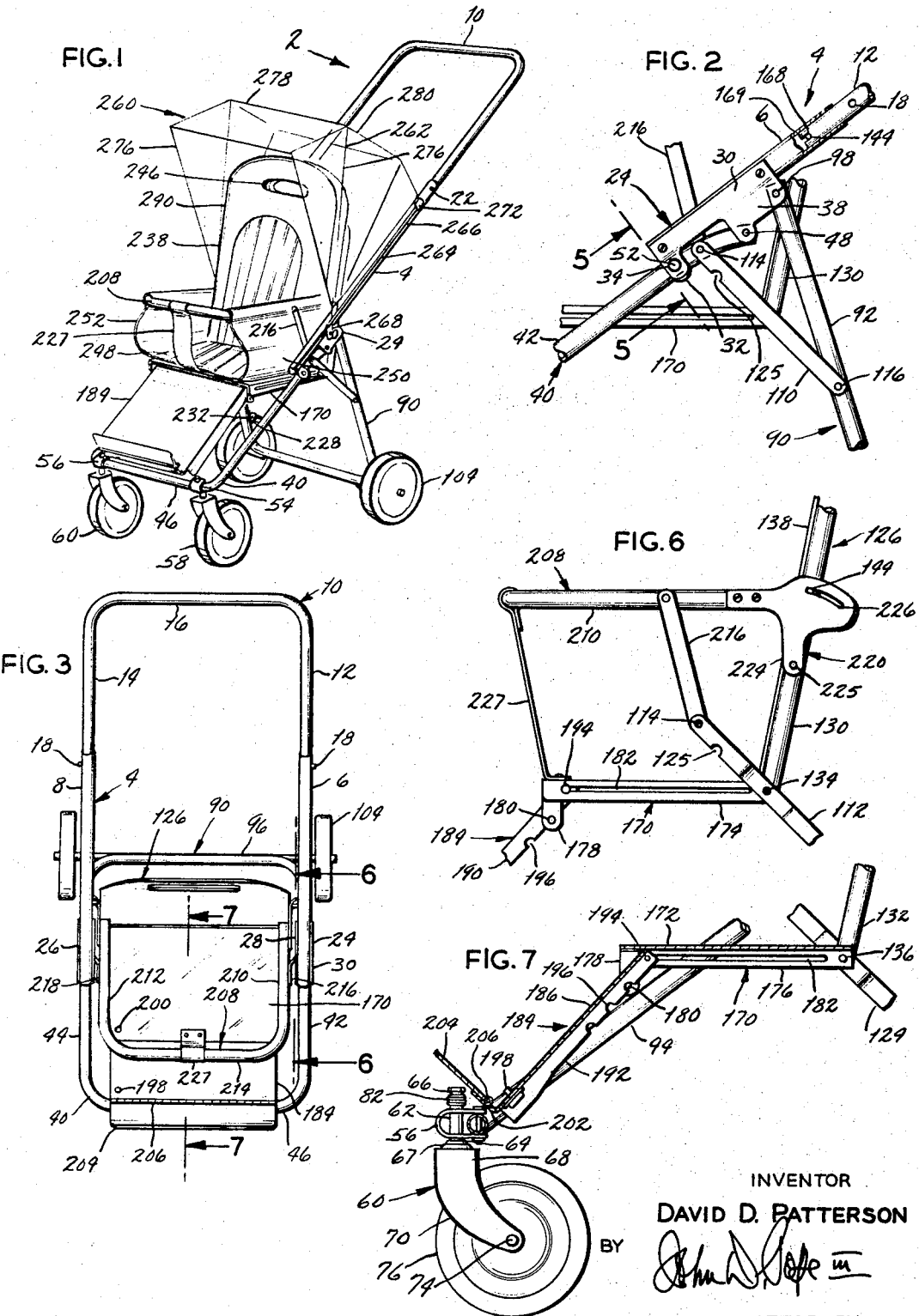
INVENTOR
DAVID D. PATTERSON
BY
ATTORNEY

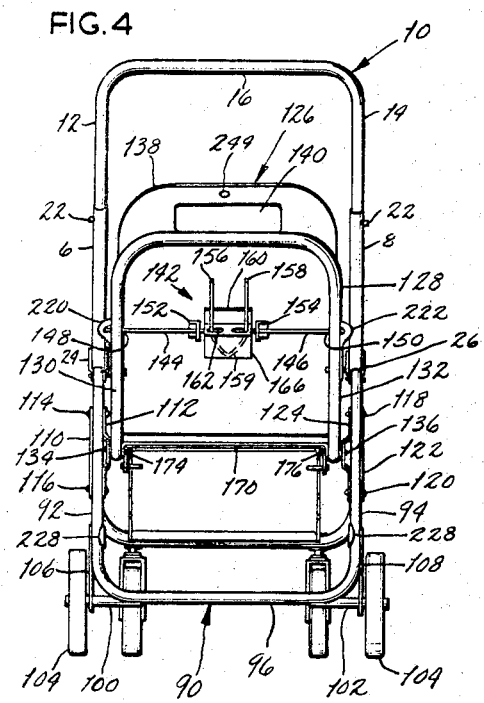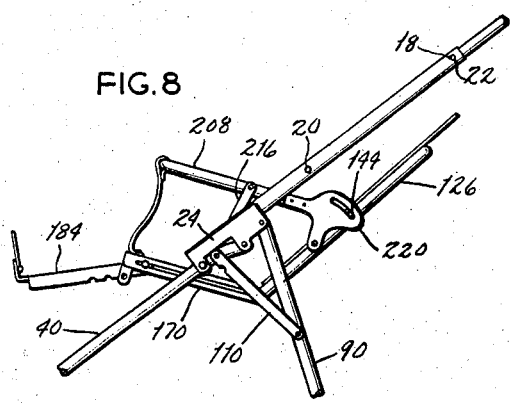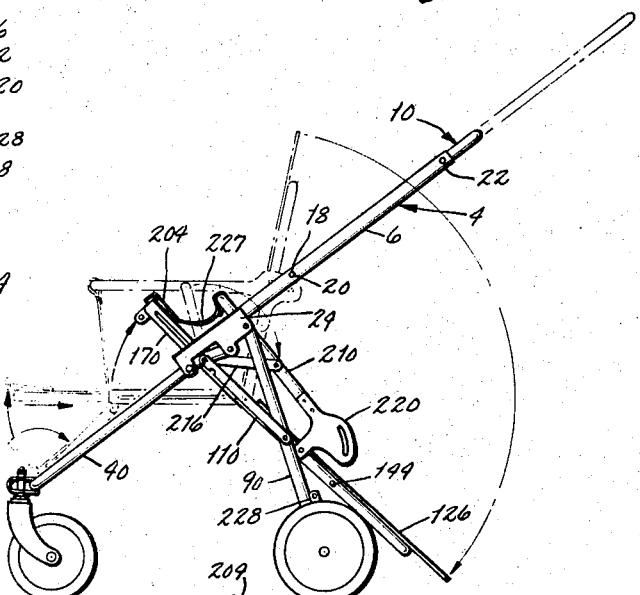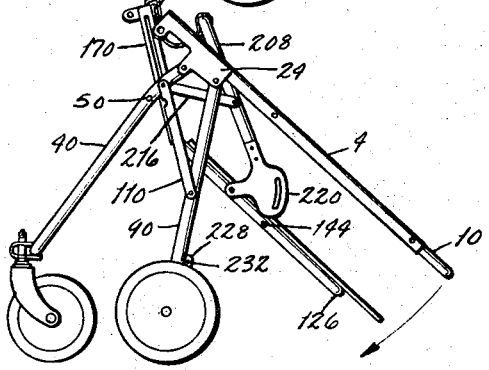

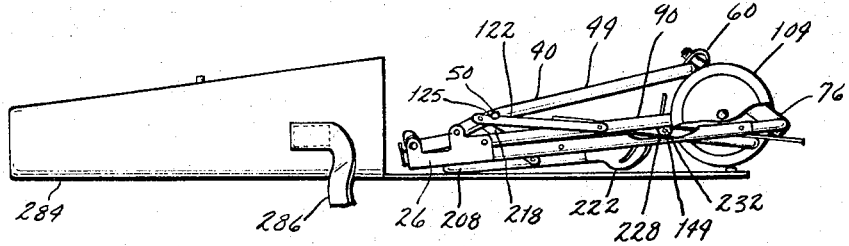
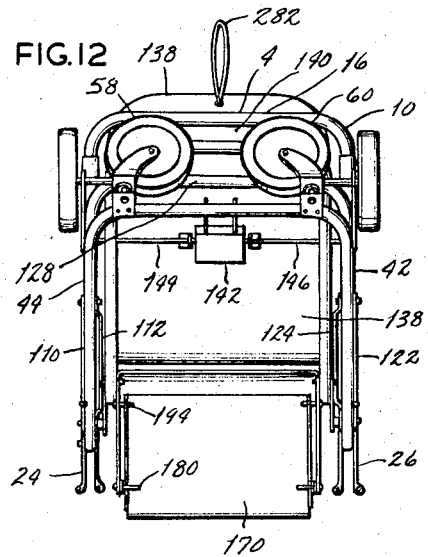
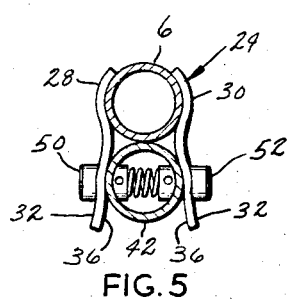

Jan. 14, 1969    D. D. PATTERSON    3,421,774
BABY STROLLERS

Filed Dec. 5, 1966    Sheet 4 of 6

INVENTOR.
DAVID D. PATTERSON
BY

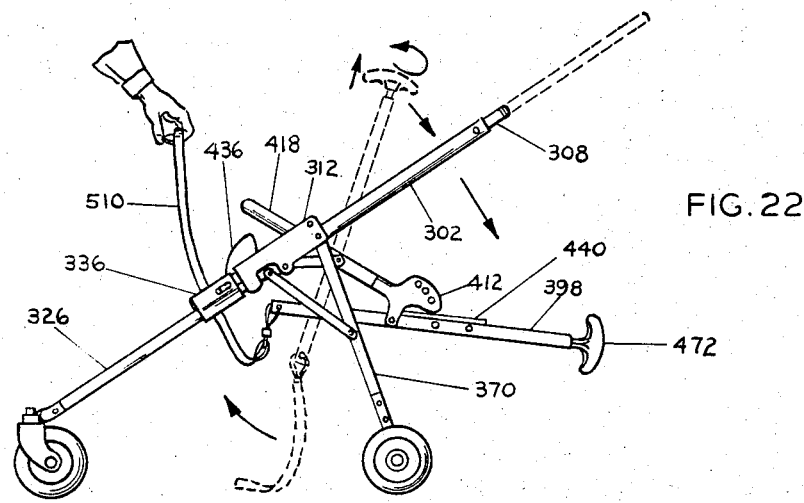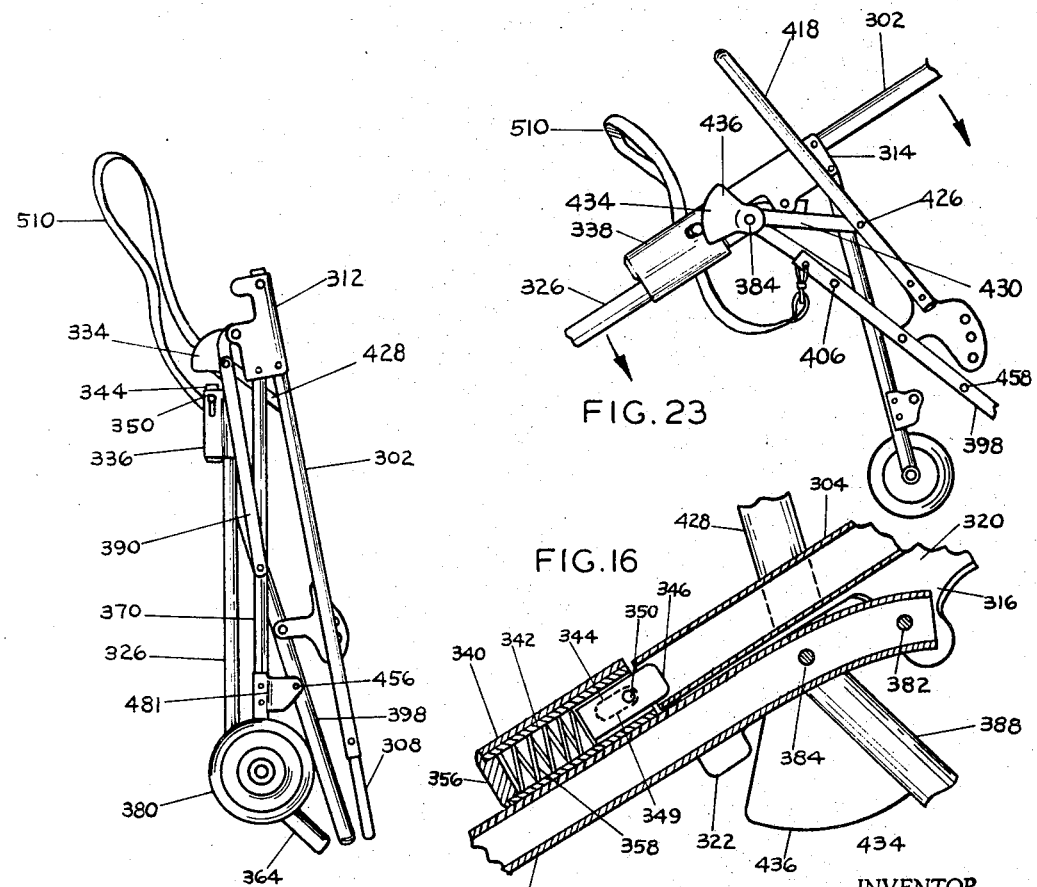

Jan. 14, 1969  D. D. PATTERSON  3,421,774
BABY STROLLERS
Filed Dec. 5, 1966  Sheet 6 of 6
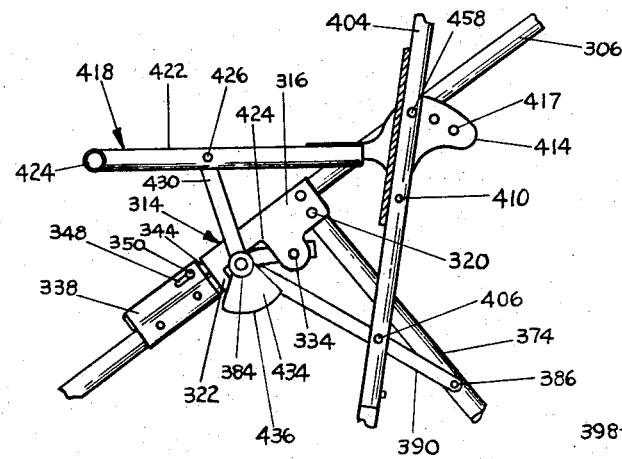
FIG. 18
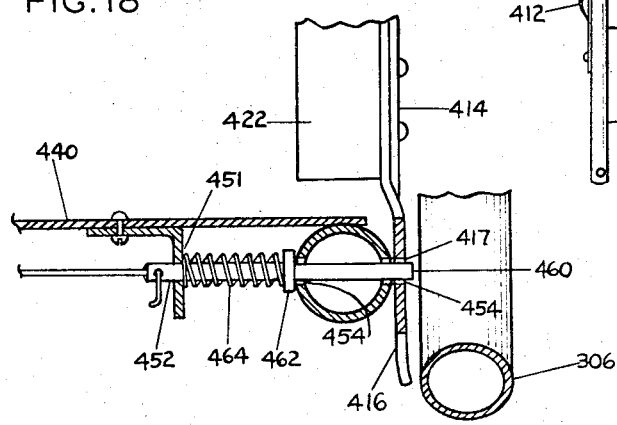
FIG. 20
FIG. 19
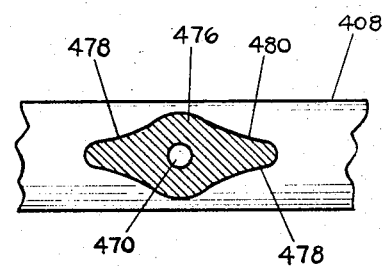
FIG. 21
INVENTOR.
DAVID D. PATTERSON
BY United States Patent Office 3,421,774
Patented Jan. 14, 1969

3,421,774
BABY STROLLERS
David D. Patterson, Seward, Nebr., assignor to
Herschal F. Garhan, Rising City, Nebr.
Filed Dec. 5, 1966, Ser. No. 599,128
U.S. Cl. 280—41        22 Claims
Int. Cl. B62d 21/14

ABSTRACT OF THE DISCLOSURE

Collapsible baby strollers which can be folded to form a compact carrying package are provided. Front and rear frames are hingedly connected to an upper frame. Frame locking means hold the front frame adjacent the upper frame as an extension, suitable links hold the front and rear frames at predetermined angles when the stroller is erected, a backrest and seat are hingedly secured to the links, backrest locking means are provided for holding the backrest at a predetermined angle to the frames, a seat is supported by a handrail in upwardly spaced relation thereto, and the handrail is supported by the backrest and front frame.

---

This invention relates to baby strollers and, more particularly, to collapsible baby strollers.

A number of different types of baby strollers are currently being marketed and some of these strollers are collapsible to a certain extent to more conveniently enable the user to fit the stroller into restricted areas such as automobile trunks or hall closets. These baby strollers, however, often incorporate a multitude of lock-type fasteners and other devices to achieve this end and these devices are often difficult to manipulate, requiring considerable time and subjecting the user of the stroller to substantial inconvenience. Moreover, such strollers do not collapse into a very compact, lightweight package which can be conveniently grasped and carried onto a bus or other vehicle where space is at a premium. On the contrary, most of the collapsible baby strollers of current manufacture merely depress into a variety of relatively compressed configurations which are too long and awkward to carry any appreciable distance by hand and, furthermore, have numerous protrusions which can easily snag clothing, catch on objects, and cause painful cuts and abrasions.

Generally speaking, the present invention relates to a baby stroller having front and rear frames which are hingedly connected to an upper frame at the lower extremity of such upper frame. Frame locking means are provided for holding the front frame adjacent the upper frame as an extension thereof. Suitable links hold the front and rear frames at predetermined angles when the stroller is in the erected position and a backrest and seat are hingedly secured to such links. Backrest locking means are provided for holding the backrest at a predetermined angle with respect to the frames. A seat is supported by a handrail located in upwardly spaced relation thereto and the handrail, in turn, is supported by the backrest and front frame. When it is desired to transform the stroller of the present invention into a compact carrying package, the frame and backrest locking means are released, whereupon the front and upper frames, as well as the backrest, can be folded toward and against the rear frame to form a compact carrying package. In a modified form of the present invention the frame locking means is actuated as the backrest folds into the collapsed position.

Among the several objects of the present invention may be noted the provision of a baby stroller which can be collapsed into a compact package for convenient carrying; the provision of a baby stroller of the type stated which collapses to a carrying package conveniently adapted for grasping; the provision of a baby carriage which employs simple and easily manipulated locking means to hold it in the erect position; the provision of a baby stroller having a backrest which can be optionally placed in a substantially upright position or a reclined position; the provision of a baby carriage having a canopy which does not obstruct the user's view of the child in the stroller; and the provision of a baby stroller which is attractive in appearance, simple and rugged in construction, and easy and economical to manufacture. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, FIG. 1 is a perspective view of a baby carriage constructed in accordance with and embodying the present invention;

FIG. 2 is a fragmentary side elevational view, partially broken away and in section, of the baby carriage showing the structural members thereof;

FIG. 3 is a top plan view of the baby carriage showing the structural portions thereof, the fabric portions and canopy being omitted;

FIG. 4 is a rear elevational view of the baby carriage;

FIG. 5 is a sectional view taken along line 5—5 of FIG. 2;

Figure 13:
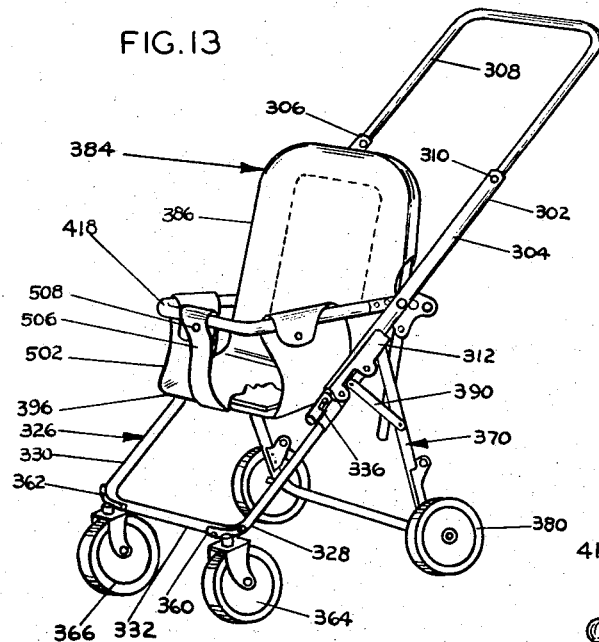
Figure 15:
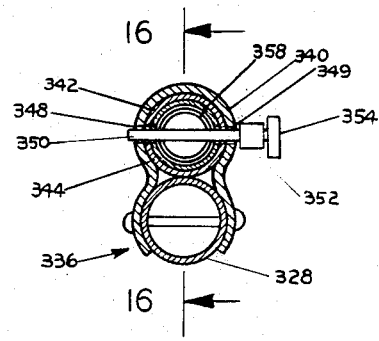
Figure 14:
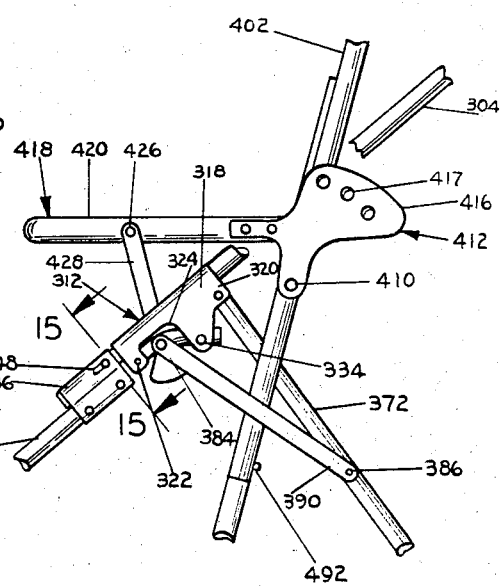
Figure 17:
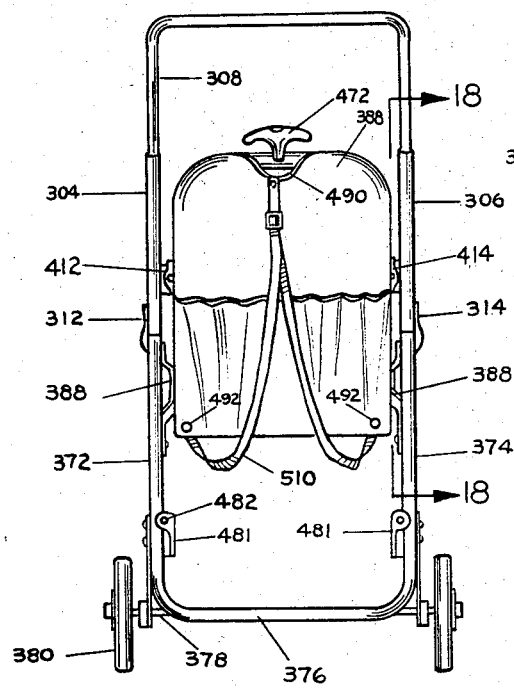

FIGS. 6 and 7 are sectional views taken along lines 6—6 and 7—7, respectively, of FIG. 3;

FIG. 8 is a fragmentary side elevational view showing the backrest in the reclined position;

FIGS. 9, 10, and 11 are side elevational views, partially in phantom, sequentially showing the steps of collapsing the baby stroller of the present invention;

FIG. 12 is a plan view of the collapsed baby stroller;

FIG. 13 is a perspective view of a modified baby stroller constructed in accordance with and embodying the present invention;

FIG. 14 is a fragmentary side elevational view, partially broken away, of the modified baby stroller;

FIG. 15 is a sectional view taken along line 15—15 of FIG. 14;

FIG. 16 is a sectional view taken along line 16—16 of FIG. 15;

FIG. 17 is a rear elevational view of the modified baby stroller;

FIG. 18 is a sectional view taken along line 18—18 of FIG. 17;

FIG. 19 is a fragmentary rear elevational view of the modified baby stroller showing the backrest locking mechanism;

FIGS. 20 and 21 are sectional views taken along lines 20—20 and 21—21, respectively, of FIG. 19;

FIGS. 22 and 23 are side elevational views sequentially showing the positions of the various elements of the modified baby stroller as it is collapsed; and FIG. 24 is a side elevational view showing the modiled baby stroller in the collapsed position.

Corresponding reference characters indicate corresponding parts throughout the several views of the drawings.

Referring now to the drawings, which illustrate practical embodiments of the present invention, 2 designates a baby stroller having an upper frame 4 including tubular side members 6, 8, and a U-shaped tubular handle 10, telescopically mounted within side members 6, 8. Handle 10 includes parallel legs 12, 14, which slidably fit within tubular side members 6, 8, respectively, and are transversely connected at their upper ends by a gripping portion 16. At their lower ends, legs 12, 14, are provided with outwardly projecting spring-loaded buttons 18 which engage outwardly facing apertures 20 located intermediate the ends of side members 6, 8, to hold handle 10 in a retracted or so-called collapsed position. Similarly, at their upper ends side members 6, 8, are provided with another pair of outwardly facing apertures 22 which are also adapted to accept spring-loaded buttons 18. When buttons 18 engage apertures 22, handle 10 will be in an extended position. The user can quickly change the position of handle 10 merely by pushing buttons 18 inwardly past the particular set of apertures 20 or 22 through which they project and simultaneously pulling or pushing on gripping portion 16.

Riveted or otherwise securely fastened to the lower ends of side members 6, 8, are hinge brackets 24, 26, respectively, and inasmuch as brackets 24, 26, are identical, only hinge bracket 24 will be described herein in detail. As will be seen by reference to FIGS. 2 and 5, hinge bracket 24 comprises inner and outer hinge plates 28, 30, each of which are contoured adjacent their upper margins to conform to the circular peripheral shape of side member 6. Hinge plates 28, 30, include forwardly presented downwardly projecting locking ears 32 which are provided with axially aligned opposed apertures 34 and are flared slightly outwardly beyond apertures 34 in the provision of camming surfaces 36. Rearwardly and upwardly from ears 32, plates 28, 30, are integrally provided with downwardly projecting spaced parallel hinge tabs 38.

Hingedly secured to upper frame 4 at hinge brackets 24, 26, is a front frame 40 including spaced parallel side legs 42, 44, which integrally merge at their lower ends into a transversely extending forward cross member 46. The upper ends of legs 42, 44, fit between locking ears 32 and terminate intermediate hinge tabs 38 of hinge brackets 24, 26, to which they are swingably secured by means of hinge pins 48. Operatively mounted in the upper ends of each of legs 42, 44, are spring-loaded buttons 50, 52, which project transversely therefrom and engage apertures 34 of locking ears 32, thereby holding front frame 40 in an erected position wherein legs 42, 44, form parallel extensions of side members 6, 8, respectively. In this connection, it should be noted that intermediate locking ears 32, the upper surfaces of legs 42, 44, abut against the undersurfaces of side members 6, 8, and therebeyond, that is intermediate locking ears 32 and hinge tabs 38, legs 42, 44, are bowed slightly outwardly so as to provide sufficient clearance for swinging movement with respect to upper frame 4, as best seen in FIG. 2. It is readily apparent from FIG. 1 and the foregoing description that front frame 40 can be folded over substantially onto upper frame 4 merely by pressing buttons 50, 52, inwardly and simultaneously pivoting legs 42, 44, with respect to side members 6, 8, about hinge pins 48. Conversely, when it is desired to bring front frame 40 into substantially parallel relation with respect to upper frame 4, that is into an erected position, legs 42, 44, are folded outwardly with respect to side members 6, 8, until buttons 50, 52, engage apertures 34. In the latter instance, camming surfaces 36 will cam buttons 50, 52, inwardly against the bias of their springs as legs 42, 44, pass between hinge plates 28, 30, of hinge brackets 24, 26.

At the arcuate junctures of legs 42, 44, and cross member 46, front frame 40 is provided with a pair of forwardly projecting caster brackets 54, 56, which carry caster-type wheel assemblies 58, 60. Inasmuch as wheel assemblies 58, 60, are identical, only wheel assembly 60 will be described herein in detail. Referring now to FIG. 7, wheel assembly 60 includes a vertically presented sleeve 62 mounted securely within bracket 56 in outwardly spaced relation to cross member 46, sleeve 62 being provided at its lower end with a downwardly opening bell-shaped end portion 64 having a plurality of ball bearings suitably mounted therein. Fitted through sleeve 62 is a pintle 66 which downwardly terminates at a flange 67 on which the ball bearings ride, and rigidly secured to flange 67 is a fork 68 having spaced parallel furcations 70, which are angulated with respect to pintle 66. Journaled intermediate furcations 70, on an axle 74, is a conventional rubber-tired wheel 76. Inasmuch as the axis of axle 74 is presented in offset relation to the vertical axis of pintle 66, wheel assembly 60 will always orient itself in a position wherein axle 74 is to the rear of pintle 66 and normal to the direction of travel as stroller 2 is pushed along the pavement. Pintle 66 projects upwardly beyond sleeve 62 where it is provided with a spiral spring 82 which also engages sleeve 62 and normally biases wheel assembly 60 to an inwardly facing position wherein wheel 76 is substantially parallel to cross member 46.

Also hingedly joined to upper frame 4 at hinge brackets 24, 26, is a rear frame 90 including spaced parallel legs 92, 94, which, at their lower ends, arcuately merge into a transversely extending rear cross member 96. At their upper ends, legs 92, 94, are journaled to brackets 24, 26, intermediate hinge plates 28, 30, by means of hinge pins 98 located parallel to and rearwardly from hinge pins 48. Riveted to the underside of cross member 96 at its arcuate junctures with legs 92, 94, and projecting axially outwardly therefrom beyond the outer margins of legs 92, 94, are axles 100, 102, having conventional rubber-tired wheels 104 rotatably mounted thereon. Fitted over axles 100, 102, at their lower ends and extending upwardly to legs, 92, 94, respectively, where they are rigidly affixed at their upper ends, are axle braces 106, 108, which not only brace axles 100, 102, but also prevent wheels 104 from riding inwardly thereon.

Interconnecting legs 42 and 92, as will be seen by reference to FIGS. 2, 4, and 6, are spaced parallel outer and inner links 110, 112, which are journaled thereto by means of pins 114, 116, pin 114 being interposed between pin 48 and buttons 50, 52, on leg 42. Similarly interconnecting legs 44, 94, and being journaled thereto by means of pins 118, 120, respectively, are outer and inner links 122, 124. Links 110, 112, and 122, 124, in close proximity to their respective pins 114, 118, are provided with arcuate cutouts 125 for accommodating buttons 50, 52, when stroller 2 is in the collapsed position, as best seen in FIG. 11.

Hingedly fastened to inner links 112, 124, intermediate their ends, as best seen in FIGS. 4 and 6, is a backrest 126 including a U-shaped tubular back frame 128 having upstanding legs 130, 132, which are journaled at their lower ends to inner links 112, 124, by means of pins 134, 136. It should be noted that links 112, 124, are bowed slightly inwardly so that the heads of pins 134, 136, will not interfere with legs 92, 94, when stroller 2 is collapsed. Moreover, legs 130, 132, are spaced slightly inwardly from links 112, 124, by means of spacer sleeves located on pins 134, 136, all as best seen in FIG. 4. Riveted or otherwise securely fastened to the forwardly presented surfaces of back frame 128 is a backrest plate 138 which extends above frame 128 where it is provided with an elongated aperture 140. It should be noted that backrest 126 will fold rearwardly on pins 134, 136, into substantially parallel side-by-side relation with rear frame 90.

Mounted on the back face of backrest plate 138, as will be seen by reference to FIG. 4, is a lock assembly 142 including two laterally extending coaxially aligned locking rods 144, 146, which, at their outer ends, extend through and are slidably mounted in transversely extending holes 148, 150, formed in upstanding legs 130, 132, of back frame 128. At their inner ends, rods 144, 146, are slidably fitted through outwardly projecting tabs 152, 154, which are riveted to backrest plate 138 and inwardly beyond tabs 152, 154, rods 144, 146, are bent at approximately right angles in the provision of unlocking levers 156, 158, which extend upwardly and terminate in close proximity to elongated aperture 140. Interposed between levers 156, 158, is a U-shaped or other suitable spring 159 having ends which engage levers 156, 158, to urger levers 156, 158, and locking rods 144, 146, apart. Levers 156, 158, are held in place with respect to backrest plate 138 by means of a guide member 160 having inwardly extending opposed notches 162 which slidably receive levers 156, 158, to prevent rods 144, 146, from rotating within tabs 152, 154, and holes 148, 150. Guide member 160 outwardly terminates at a lip 166 which extends over and engages the ends of U-shaped spring 159 to maintain such spring in operative engagement with levers 156, 158. Outwardly beyond legs 130, 132, locking rods 144, 146, project into opposed apertures 168 formed in side members 6, 8, to hold backrest 126 at a predetermined angle with respect to upper frame 4 as well as with respect to front and rear frames 40, 90, respectively. It should be noted that the ends of legs 12, 14, of handle 10 are provided with axially extending elongated cut-outs 169 which accommodate the inwardly projecting ends of rods 144, 146, when handle 10 is in the collapsed position, as best seen in FIG. 2.

Also hingedly connected to inner links 112, 124, as well as to backrest 126 at pins 134, 136, is a seat 170 including a seat plate 172 provided along its side margins with depending side flanges 174, 176, which are secured to legs 130, 132, of frame 128 at their rear ends by pins 134, 136. At their forward ends, flanges 174, 176, merge into depending ears 178, each having an inwardly projecting pin 180. Intermediate pins 180 and pins 134, 136, flanges 174, 176, are provided with longitudinally extending slots 182.

Projecting obliquely downwardly in close proximity to the front margin of seat 170 is a legrest 184 integrally including a front plate 186 and side flanges 190, 192, the latter of which are secured to flanges 174, 176, of seat 170 by pins 194 which, in turn, are slidably fitted with slots 182. At their upper ends, flanges 190, 192, are provided with a plurality of spaced notches 196 which receive inwardly projecting pins 180. In this manner legrest 184 can be held in a plurality of angulated positions with respect to seat 170 and can be lifted upwardly until substantially parallel to seat 170 for subsequent insertion under seat 170, in which case pins 194 will ride in elongated slots 182 while the bottom margin of flanges 190, 192, will slide on pins 180. Mounted on front plate 186 and projecting upwardly therefrom in close proximity to flange 190 is a spring-loaded button 198 which engages an aperture 200 located in seat plate 172 when legrest 184 is slid to its fullest extent beneath seat 170. At its lower or front margin front plate 186 is turned upwardly in the provision of a lip 202 to which a treadle 204 is journaled by means of a transversely extending hinge pin 206. Thus, treadle 204 can be folded over toward front plate 186.

Projecting forwardly from backrest 126 in upwardly spaced substantially parallel relation to seat 170 is a handrail 208 sized to fit around a child's torso when the child sits on seat 170. Handrail 208 includes side bars 210, 212, which integrally merge into a front bar 214. Intermediate their ends side bars 210, 212, are pivotally connected to links 216, 218, which are, in turn, pivotally connected at their lower ends to legs 42, 44, of front frame 40 at pins 114. As best seen in FIG. 6, side bars 210, 212, are fitted at their rear ends with hinge brackets 220, 222, having downwardly projecting ears 224 which are hingedly secured to legs 130, 132, of back frame 128 by means of pins 225. The upper portions of brackets 220, 222, are flared outwardly and provided with arcuate slots 226 through which locking rods 144, 146, project. Looped over front bar 214 and extending downwardly therefrom is a support strap 227 which is riveted to seat plate 172 in close proximity to its front margin for support purposes.

Riveted or otherwise rigidly fastened to the inwardly presented surfaces of legs 92, 94, of rear frame 90 are opposed locking tabs 228, each being outwardly flared in the provision of a camming surface and each having an aperture 232 which registers with and receives the outer ends of locking rods 144, 146, when backrest 126 is folded rearwardly.

Referring now to FIG. 1, baby stroller 2 is provided with a fabric or other suitable seat liner 238 including a padded back portion 240 mounted on backrest 126 provided with an upper flap which forms a downwardly opening pocket into which the upper portion of backrest plate 138 extends, the flap being secured thereto by means of a snap 244. Back portion 240 is further provided with an elongated cutout 246 which registers with elongated aperture 140 in backrest plate 138. At its lower margin back portion 240 is joined to a padded seat portion 248 having fabric side panels 250, 252, which are looped over side bars 210, 212, respectively, of handrail 208.

If desired, baby stroller 2 can be provided with a depending bag-like parcel carrier (not shown) which is preferably riveted or snapped to the upper end of back frame 128.

Removably mounted on upper frame 4 is a buggy-type canopy 260 including a canopy frame 262 provided with a U-shaped support rod 264 having parallel legs 266 located adjacent side members 6, 8. At their lower ends, legs 266 are provided with mounting tabs 268 which extend downwardly past hinge brackets 24, 26, to which they are secured by means of thumb screws which engage nuts welded to outer hinge plates 30. Near their upper ends, legs 266 are provided with resilient retention ears 272 which frictionaly engage the outwardly presented surfaces of side members 6, 8, to hold support rod 264 in juxtaposition to side members 6, 8. Pivotally secured legs 266 are a plurality of U-shaped canopy stays 276 and secured thereto, as well as to support rod 264, is a canopy cover 278 having a transparent plastic panel or window 280 located intermediate the bight portions of two of stays 276. This enables the user to look down and observe the child from his or her position behind stroller 2. If desired, a plurality of transversely extending depending panels can be secured to canopy cover 278 immediately below window 280 so as to block direct rays of the sun and lessen the chance of such rays striking the child. Canopy 260 can be folded into a compact configuration against upper frame 4, and, if desired, it can be removed altogether from stroller 2 by unscrewing the thumb screws.

Canopy 260 and seat liner 238 have been omitted from all but one of the figures so as to not obscure the various structural elements of stroller 2.

When the user desires to board a bus, enter an automobile or otherwise bring stroller 2 into a somewhat restricted area, stroller 2 can be easily and simply transformed into a highly compact carrying package by the manipulation of a minimum number of locking devices and structural elements as best seen in FIGS. 9 through 11. At the outset, spring-loaded buttons 18 are pushed inwardly through apertures 22 and at the same time gripping portion 16 of handle 10 is urged toward side members 6, 8, whereupon legs 12, 14, will slide telescopically into tubular side members 6, 8, until buttons 18 come to apertures 20 at which point they will spring outwardly and lock handle 10 in a collapsed position. It should be noted that axially extending cutouts 169 will receive the inwardly projecting outer ends of locking rods 144, 146, so that such rods do not obstruct the axial movement of legs 12, 14. Next treadle 204 is swung over toward the face of front plate 186 and legrest 184 is lifted upwardly out of notches 196 until it is substantially parallel to seat 170, whereupon it is slid rearwardly until spring-loaded button 198 engages aperture 200 in seat plate 172, thereby locking legrest 184 to seat 170. In this position treadle 204 will be disposed over front plate 186, all as best seen in FIG. 9.

The user thereafter squeezes locking levers 156, 158, together against the bias of spring 159, thereby withdrawing the ends of locking rods 144, 146, from apertures 168 in side members 6, 8, and from arcuate slots 226 located in hinge brackets 220, 222. This permits backrest 126 to be swung downwardly into close proximity to and in overlying relation with rear frame 90. At the same time handrail 208 will move into a close proximity to and substantially parallel with backrest 126 by virtue of the configuration and location of the pivotal connections formed by links 216, 218, and hinge brackets 220, 222. Support strap 227 will draw seat 170 upwardly as handrail 208 moves into a collapsed position so that it forms a continuation of collapsed backrest 126. At this juncture, however, it should be noted that the ends of locking rods 144, 146, are not brought into engagement with apertures 232 of locking tabs 228.

Subsequently buttons 50, 52, are pressed inwardly into their respective apertures 34 and front frame 40 is simultaneously folded toward upper and rear frames 4, 90, as best seen in FIG. 10. This can best be accomplished by grasping stroller 2 at hinge brackets 24, 26, lifting it until wheels 76 are off the ground, and then pushing buttons 50, 52, inwardly. When buttons 50, 52, clear their respective apertures 34 the weight of the suspended front frame 40 will cause it to swing downwardly, free from locking ears 32. Inasmuch as legs 42, 92, are connected by links 110, 112, and legs 44, 94, are connected by pins 114, 116, and further in view of the locations of hinge pins 48, 114, on hinge brackets 24, 26, upper frame 4 at the same time will swing toward rear frame 90 and collapsed backrest 126 located adjacent thereto. When upper frame 4 approaches backrest 126 the latter is lifted slightly away from rear frame 90 so that gripping portion 16 of handle 10 will pass beyond the upper or outer margin of backrest plate 138. This permits side members 6, 8, of upper frame 4 to come into juxtaposition with legs 92, 94, respectively, of rear frame 90. When backrest 126 is folded back toward rear frame 90 the rear face of backrest plate 138 will engage gripping portion 16 of handle 10 and thereby hold upper frame 4 against rear frame 90 as illustrated in FIG. 11. When a slight force is applied to backrest 126 the ends of locking rods 144, 146, engage the camming surfaces of locking tabs 228 thereby urging or camming rods 144, 146, axially inwardly until they come to apertures 232, whereupon they will spring outwardly and by engaging such apertures secure backrest 126 to rear frame 90 in a side-by-side substantially flat configuration. Links 110, 112, and 122, 124, will hold legs 92, 42, and 94, 44, adjacent one another so that front frame 40 is also locked in side-by-side relation with respect to rear frame 90. As previously noted, in that position, that is in the fully collapsed position, arcuate cutouts 125 of links 110, 112, and 122, 124, will accommodate buttons 50, 52, and will not inhibit the folding of stroller 2. It should be noted that seat liner 238 and canopy 260 have been omitted from FIGS. 9 through 11 so as not to obscure the positions of the various structural elements during the various collapsing steps. It should be understood, however, that neither seat liner 238 nor canopy 260 need be removed in order to collapse stroller 2, for the former will fold with the structural elements and the latter will merely lie against upper frame 4. Neither will impede the transformation of stroller 2 into a collapsed configuration.

When completely collapsed the user can insert his hand through registered elongated cutout 246 and aperture 140 of seat liner 238 and backrest 126, respectively, and carry stroller 2 onto a bus or into some other confined area. Moreover, it is possible to provide stroller 2 with a wrist strap 282 located adjacent elongated aperture 140 as a means for more conveniently carrying stroller 2, as best seen in FIG. 12.

Also it is possible to fit collapsed stroller 2 into a carrying case 284 having a shoulder strap 286 whereby collapsed stroller 2 can be carried in an over-the-shoulder arrangement freeing both of the user's hands for other chores.

When the user again desires to use stroller 2 it can be quickly erected, simply by following the steps heretofore described in reverse order. The user reaches down, grasps levers 156, 158, between his fingers and squeezes them together until backrest 126 swings free of rear frame 90. Thereafter front frame 40 and upper frame 4 are grasped and swung away from rear frame 90 until buttons 50, 52, are cammed inwardly by camming surfaces 36 and subsequently spring outwardly into engagement with apertures 34 of locking ears 32. In this position frames 4, 40, and 90, will all be locked at predetermined angles with respect to one another. Thereafter, locking levers 156, 158, are again grasped and squeezed toward one another while backrest 126 is raised. Levers 156, 158, can either be released when the ends of locking rods 144, 146, register with the rear ends of arcuate slots 226 of brackets 220, 222, or when the ends of the rods register with opposed apertures 168 in side members 6, 8. In the former instance backrest 126 will be in a slightly reclined position as illustrated in FIG. 8 which is more suitable for naps than the fully erected position. It should be noted that hinge brackets 220, 222, if desired, can be provided with a plurality of arcuately spaced apertures in lieu of arcuate slots 226 so that backrest 126 can be optionally locked in a plurality of reclined positions.

Finally, button 198 is depressed beyond aperture 200 while legrest 184 is pulled outwardly the desired distance. Legrest 184 is subsequently lowered until one pair of notches 196 engages inwardly projecting opposed pins 180 and treadle 204 is swung upwardly to receive the soles of the child's feet.

It is apparent from the foregoing that stroller 2 collapses into a highly compact, easy to carry, package, and the transformation from the erected position to the collapsed position or vice versa is easily achieved merely by the manipulation of a few buttons and hinged structural members. When in the collapsed position, stroller 2 can be carried in a manner similar to a conventional shopping bag.

Referring now to FIGS. 13 through 24, a modified form of baby stroller 300, which is very similar to stroller 2 is shown. It includes a U-shaped upper frame 302 having side members 304, 306, which telescopically receive a U-shaped handle 308, handle 308 being held in either a retracted or extended position by means of spring-loaded buttons 310. At their lower ends, side members 304, 306, are provided with hinge brackets 312, 314, respectively, each including an inner and outer hinge plate 316, 318, which is riveted or otherwise rigidly fastened to the sides of side members 304, 306, in spaced parallel relation. Each hinge plate 316, 318, in turn, possesses a downwardly projecting hinge tab 320 at its rear end, a downwardly projecting guide ear 322 at its forward end, and an elongated cutout 324 located therebetween.

Hingedly secured to upper frame 302 at hinge brackets 312, 314, is a U-shaped front frame 326 having side legs 328, 330, which integrally merge at their lower ends into a transversely extending forward cross-member 332. Side legs 328, 330, in effect, form a forward continuation of tubular side members 304, 306, and are pivotally connected thereto by means of hinge pins 334 which extend through the extreme rear ends of legs 328, 330, and the forward ends of hinge tabs 320 in downwardly spaced relation to the undersurface of side members 304, 306. This provides sufficient clearance for the portions of legs 328, 330, located upwardly beyond pins 334 when front frame 326 folds against upper frame 302. Immediately forward from pins 334, legs 328, 330, bow upwardly and abut against the underside of side members 304, 306, intermediate guide ears 322.

Immediately beyond the forward ends of side members 304, 306, side legs 328, 330, carry frame locking means or units 336, 338, which are identical and, therefore, only locking unit 336 will be described in detail. Referring now to FIGS. 15 and 16, locking unit 336 includes a housing 340 which tightly embraces a guide sleeve 342 located in axial alignment with side member 304. Guide sleeve 342 possesses an internal diameter equal to or slightly less than the internal diameter of side member 304 and slidably fitted within the rear end of guide sleeve 342 is a locking plunger 344 having a slightly beveled forward end 346, sized for slidable insertion in the open forward end of tubular side member 304. Housing 340 and guide sleeve 342 are further provided with opposed pairs of registered elongated apertures 348, 349, located in the sides thereof for slidably accommodating an actuating pin 350 which extends diametrally through and is press-fitted or otherwise rigidly secured within plunger 344. The outer end of pin 350 extends no further than the outer surface of housing 340, while the inner end extends completely through elongated aperture 349, beyond which it is preferably provided with a rotatable low-friction synthetic resin bushing 352 which is held in place by a head 354 formed integrally on pin 350. When pin 350 is located at the forward end of elongated apertures 348, 349, plunger 344 will be disposed completely within guide sleeve 342 and front frame 326 will be free for articulation. However, when pin 350 abuts against the opposite or rear end of elongated apertures 348, 349, plunger 344 will project outwardly from the rear end of sleeve 342 and into the tubular end portion of side member 304, so as to prevent front frame 326 from folding with respect to upper frame 302 at hinge brackets 312, 314 (see FIG. 16). At its opposite or forward end, housing 340 is fitted with an end cap 356 and interposed between pin 350 and end cap 356 is a helical compression spring 358 for biasing plunger 344 toward its extended or locking position.

At the arcuate junctures of side legs 328, 330, and cross-member 332, front frame 326 is fitted with wheel brackets 360, 362, which swivelly carry conventional caster-type wheel assemblies 364, 366, respectively. If desired, a legrest (not shown) can be mounted on side legs 328, 330.

Also hingedly secured to upper frame 302 at hinge brackets 312, 314, is a U-shaped rear frame 370 including space parallel side legs 372, 374, which arcuately merge at their lower ends into a transversely extending rear cross-member 376 fitted with an axle 378 for carrying a pair of rear wheels 380. At their upper ends, side legs 372, 374, are swingably secured to hinge brackets 312, 314, respectively, by means of hinge pins 382 which extend through legs 372, 374, as well as hinge plates 316, 318, rearwardly from hinge pins 334.

Interconnecting side legs 328 and 372 of front and rear frames 326, 370, respectively, as well as side legs 330, 374, also of front and rear frames 326, 370, respectively, and journaled thereto by pins 384, 386 (see FIGS. 14 and 18), are pairs of parallel inner and outer connecting links 388, 390, the former of which are bowed somewhat inwardly. It should be noted that pins 384 are located within elongated cut-out 324 of hinge plates 316, 318, so that the upper ends of links 388, 390, do not in any way interfere with hinge tabs 320 or guide ears 322. Connecting links 388, 390, maintain rear frame 370 rigid at a predetermined angle with respect to front and upper frames 326, 302, respectively.

Swingably fastened to inner connecting links 388 is a backrest 398 including a U-shaped tubular back frame 400 having upstanding legs 402, 404, which are journaled at their lower ends to the opposed inwardly bowed portions of inner connecting links 388 by means of pins 406. At their upper ends, upstanding legs 402, 404, arcuately merge into a transversely extending upper cross-member 408, as illustrated in FIG. 19. Intermediate their ends, legs 402, 404, are fitted with opposed coaxial hinge pins 410 which carry back hinge brackets 412, 414, each having a rearwardly projecting segment 416 which is provided with a plurality of arcuately spaced apertures 417, and is furthermore bent slightly outwardly at its rear end in the provision of a camming surface. Rigidly secured to back hinge brackets 412, 414, forwardly from rearwardly projecting segments 416 is a forwardly projecting handrail 418 integrally including side bars 420, 422, which integrally merge at their forward ends into a front bar 424. At their rear ends, side bars 420, 422, are securely fastened to back hinge brackets 412, 414, and intermediate their ends they are fitted wtih coaxial hinge pins 426 which extend through the upper ends of support links 428, 430, thereby journaling links 428, 430, to handrail 418. Support links 428, 430, extend downwardly and near their lower ends adjacent elongated cutouts 324 of inner hinge plates 316 they are stamped or otherwise provided with outwardly projecting bosses 432 through which pins 384 extend and thereby journal support links 428, 430, to side legs 328, 330, of front frame 326. Beyond its respective boss 432, each support link 428, 430, flares outwardly in the provision of a cam segment 434 which terminates in an arcuate camming margin 436. The contour of each camming margin 436 is such that upon rearward rotation of its respective link 428 or 430, it will align with and engage bushing 352 carried on pin 350 of the particular frame locking unit 336 or 338, which is adjacent it. Continued rearward rotation of support links 428, 430, will urge pins 350 and plungers 344 forwardly until plungers 344 are completely withdrawn from the forward ends of tubular side members 304, 306. At such a point, frame locking units 336, 338, are disengaged and front frame 326 is free to fold over against upper frame 302 about hinge pins 334 (see FIGS. 18 and 23).

Transversely extending across back frame 400 is a back plate 440 which carries a backrest locking means or assembly 441 including a rotatably mounted T-shaped actuating member 442 having integral angularly presented opposed side arms 444, 446, and an elongated lower arm 448. In close proximity to upstanding legs 402, 404, back plate 440 is rigidly provided with rearwardly projecting tabs 450, 451, having axially aligned apertures 452 which register with apertures 454 formed in legs 402, 404, apertures 452, 454, further registering with opposed pairs of arcuately spaced apertures 417 formed in back hinge brackets 412, 414, when backrest 398 is pivoted with respect to the frames 302, 326, 370. Slidably carried within apertures 452, 454, of tab 450 and leg 402, respectively, is a locking pin 456 and similarly carried within apertures 452, 454, of tabs 451 and leg 404, respectively, is a locking pin 458. As will be seen in FIG. 20, each of locking pins 456, 458, possesses a rounded nose portion 460 for finding its way into apertures 417, and intermediate apertures 452, 454, each pin is provided with a shoulder-forming diametrally enlarged rim 462 for preventing pins 456, 458, from passing completely through apertures 454. Encircling pins 456, 458, and interposed between rims 462 thereon and tabs 450, 451, are helical compression springs 464 for urging locking pins 456, 458, outwardly and into engagement with opposed pairs of apertures 417. Interconnecting the outer end of side arm 444 of actuating member 442 and the inner end of pin 456 is a connecting wire 466 and similarly connecting arm 446 and pin 458 is a connecting wire 468. The outer end of elongated lower arm 448 of actuating member 442 is pivotally secured to an actuating rod 470 which extends upwardly through upper cross-member 408 of back frame 400 where it is rotatably provided with an actuating handle 472 integrally including a gripping portion 474 and a shank 476, the latter of which encircles the upper end of rod 470 and is further provided with opposed axially extending side flanges 478 (see FIG. 21). Shank 476 fits within an aperture 480 formed in the upper wall portion of upper cross-member 408 and shaped to conform to the cross-sectional configuration of shank 476. It should be noted that when shank 476 is within aperture 480 the angular disposition of actuating member 442 is such that pins 456, 458, will project outwardly beyond the side of upstanding legs 402, 404, for engagement with arcuately spaced apertures 417. However, when shank 476 is removed from aperture 480, actuating rod 470 will be drawn upwardly, thereby rotating actuating member 442 and canting side arms 444, 446, even further. This will draw connecting wires 466, 468, inwardly which, in turn, will pull pins 456, 458, axially inwardly and out of apertures 417 so as to release back frame 400 for free swinging movement. Handle 472 can be maintained in its extended position by withdrawing it and then turning it slightly so that side flanges 478 do not register with the notches of aperture 480. In such a position, pins 456, 458, will remain retracted and backrest 398 can swing freely.

When back frame 400 is folded over against rear frame 370, pins 456, 458, align with lock tabs 481 which are affixed to and project rearwardly from side legs 372, 374, of rear frame 370. Lock tabs 481 are provided with apertures 482 which accept pins 456, 458, so that back frame 400 can be optionally held in side-by-side relation with respect to rear frame 370.

Referring again to FIGS. 13 and 16, stroller 300 is provided with a fabric or other suitable seat section 484 including a padded back panel 486 which is sewed or otherwise joined to a cover panel 488 along its top and upper side margins so as to envelop the upper portion of back frame 400 located above hinge brackets 412, 414. Cover panel 488 has a central cutout 490 for accommodating actuating handle 472 and extends downwardly along upstanding legs 402, 404, to which it is secured by snaps 492. Sewed to the bottom and lower side margins of cover panel 488 is a rear panel 494 which forms a carrying pouch adapted to receive light parcels and the like. Along its bottom margin, back panel integrally merges into a padded seat panel 496 having a light plywood board or other suitable somewhat rigid member 498 fitted therein for providing support for the child. Along its side margins seat panel 496 merges into opposed side panels 500, 502, having ears 504 at their upper ends which fold over side bars 420, 422, of handrail 418 forwardly of support links 428, 430, and are secured to the outer face of side panels 500, 502, by means of snaps 505 so as to hold seat panel 496 substantially horizontal. To provide additional support for seat panel 496, it is centrally provided along its forward margin with a support strap 506 which extends upwardly and is looped over front bar 424 of handrail 418 and secured to itself by a snap 508.

Connected to the extreme lower ends of upstanding legs 402, 404, forming part of back frame 400 is a carrying strap 510 which can be optionally snapped intermediate its ends to the cover panel 488 so as not to depend freely when stroller 300 is in erected position.

When it is desired to collapse stroller 300, the user first manipulates spring-loaded buttons 310 and moves handle 308 telescopically within side members 304, 306, to the collapsed position. Next, the carrying strap 510 is unsnapped from cover panel 488 and allowed to depend downwardly in forwardly spaced relation to rear cross-member 376. Thereafter the user merely lifts actuating handle 472 so as to withdraw its shank 476 from aperture 480, and then turns handle 472 slightly so that the ends of the side flanges 478 engage the upper surface of cross-member 408 and maintain shank 476 in the withdrawn position. This, of course, withdraws pins 456, 458, from apertures 417 and thereby frees back frame 400 for free swinging movement as previously noted. Accordingly, as will be seen by reference to FIG. 22, back frame 400 is lowered against rear frame 370. As back frame 400 swings rearwardly handrail 418 is also carried rearwardly and inasmuch as it is pivotally connected to support links 428, 430, they too are rotated rearwardly about pins 384. As seen in FIG. 23, the rearward rotation of links 428, 430, brings their respective camming margins 436 into engagement with bushings 352 carried on pins 350, thereby forcing pins 350 forwardly and retracting plungers 344 from the forward ends of tubular side members 304, 306. In this connection, it should be noted that when back frame 400 rests against rear frame 370, as illustrated in FIG. 23, camming segments 434 will still maintain plunger 344 in the retracted position so that front frame 326 is free to fold with respect to upper frame 302. At this point, the user merely reaches between front bar 424 of handrail 418 and forward cross-member 332 of front frame 326 and grasps the center of the depending carrying strap 510. When carrying strap 510 is lifted upwardly, the entire weight of stroller 300 is supported at the inverted lower ends of upstanding legs 402, 404, forming part of back frame 400. Accordingly, by virtue of their own weight, front frame 326, rear frame 370, and upper frame 302 will simultaneously fold into side-by-side relation with back frame 400 as well as with one another as illustrated in FIG. 24. The user can then place the carrying strap 510 over his or her shoulder and have both hands free for tending to the child or other matters. The weight of the various frames 302, 326, 370, 400, will maintain the stroller 300 in this collapsed position as long as it is suspended from carrying strap 510.

If preferred, stroller 300 can be collapsed manipulating the various frames as previously discussed in conjunction with stroller 2. Moreover, frames 302, 326, 370, 400, can be rigidly maintained in the collapsed position by allowing pins 456, 458, to engage apertures 482 formed in lock tabs 481. When this is done, it is desirable to manipulate back frame 400 and upper frame 302 as they are folded so that upper cross-member 408 of the former is presented outwardly from the gripping portion of handle 308 forming part of the latter. The gripping portion or upper end of handle 308 is interposed between upper cross-member 408 and cross-member 376 of rear frame 370 as previously discussed in conjunction with stroller 2 and illustrated in FIG. 11.

To transform stroller 300 from the collapsed to the erected position, handle 472 is grasped and pulled slightly outwardly so as to withdraw pins 456, 458, from apertures 482, if, in fact, pins 456, 458, are in engagement with such apertures. Thereafter upper frame 302 is folded upwardly until its side members 304, 306, align with locking units 336, 338, and form continuations of side legs 328, 330. This movement will also bring rear frame 370 to its erected position, inasmuch as it is connected by connecting links 388, 390, to front frame 326. Moreover, the frames will remain in this position without additional support. Backrest 398 can now be grasped and raised upwardly until the desired inclination is achieved, whereupon handle 472 is turned so that shank 476 fits within aperture 480 and allows pins 456, 458, to extend outwardly into engagement with a pair of apertures 417 in hinge brackets 412, 414. It is significant to note that when upstanding legs 402, 404, of back frame 400 reach hinge brackets 412, 414, arcuate camming margins 436 of support links 428, 430, will be free of bushings 352 so that plungers 344 are disposed within the tubular ends of side members 304, 306, and thereby rigidly maintain frames 302, 326, 370, in the erected position (see FIG. 14). The inclination of backrest 398 can be altered by momentarily withdrawing handle 472 and subsequently moving frame 400 so as to bring pins 456, 458, into engagement with a different pair of apertures 417.

Seat section 484 has been omitted from FIGS. 14–16 and 18–24 so as not to obscure the various other elements of stroller 300. It is sufficient to note that seat section 484 merely folds along with frames 302, 326, 370, 400, and in no way interferes with their movement.

It is obvious from the foregoing disclosure that stroller 300 can be collapsed or erected with a minimum amount of manipulation of mechanical parts. In fact, the entire transformation to the collapsed position can be achieved by the use of one hand, which permits the user to hold the child with his or her opposite arm during such transformation. Furthermore, frames 302, 326, 370, and 400, as well as handrail 418 are all preferably constructed from lightweight tubular stock while wheels 364, 366, 380, are preferably constructed from a plastic material so as to reduce the weight of stroller 300 to an absolute minimum. Strollers conforming to the present disclosure have been fabricated weighing as little as six pounds. Thus, it is apparent that a woman can easily carry a stroller 300 onto a bus or into a store without inconvenience or strain.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A collapsible baby stroller comprising upper, front and rear frames, all hingedly mounted with respect to one another at hinge connections for movement from an erected position wherein the frames are disposed at predetermined angles with respect to one another to a collapsed position wherein the frames are presented substantially in side-by-side relation, connecting links pivotally connected to and interconnecting the front and rear frames in spaced relation to the hinge connections by which the front and rear frames are hingedly mounted with respect to one another, frame locking means for holding the frames in erected position, a backrest carried by at least one of the frames, and a seat projecting forwardly from the backrest, the backrest being hingedly mounted with respect to the frames, and backrest locking means for releasably holding the backrest at at least one predetermined angle with respect to the frames, and support means for holding the seat substantially horizontal when the frames are in the erected position.

2. A baby stroller according to claim 1 in which the backrest is hingedly connected at its lower end to the connecting links.

3. A baby stroller according to claim 2 and further characterized by a handrail hingedly secured to the backrest and presented in upwardly spaced relation to the seat.

4. A baby stroller according to claim 3 and further characterized by support links interconnecting the handrail and front frame for holding the handrail in outwardly projecting relation to the backrest when the frames are in the erected position.

5. A stroller according to claim 4 wherein the support means comprises suspension means interconnecting the handrail and seat for holding the seat in a predetermined position beneath the handrail when the frames are in the erected position.

6. A baby stroller according to claim 1 and further characterized by at least one bracket extending between the handrail and backrest when the stroller is in the erected position, the backrest locking means releasably engaging the bracket in spaced relation to the hinged connection between the handrail and backrest, whereby to optionally hold the backrest and handrail at a predetermined angle with respect to one another.

7. A baby stroller according to claim 12 in which the bracket when the stroller is in the erected position extends past the sides of the backrest where the bracket is provided with at least one aperture located in spaced relation to the hinged connection between the backrest and handrail; and in which the backrest locking means comprises a pin slidably mounted on the backrest for movement into and out of engagement with the aperture, and actuating means for moving the pin.

8. A baby stroller according to claim 6 and further characterized by support arms pivotally interconnecting the upper frame and handrail in spaced relation to the hinged juncture of the backrest and handrail.

9. A baby stroller according to claim 1 in which the upper frame includes a tubular member having an open end located adjacent the front frame when the stroller is in the erected position; and in which the frame locking means comprises a sleeve mounted on the front frame in axial registration with the open end of the tubular member and a plunger slidably mounted within the sleeve for movement from an extended position wherein it extends into the open end of the tubular member, so as to prevent pivotal movement between the front and upper frames, to a retracted position wherein it is free of the tubular member, so as to permit the front frame to fold with respect to the upper frame, and drive means connected to the plunger for moving it.

10. A baby stroller according to claim 9 and further characterized by a cam adapted to engage the drive means and actuated by the backrest for moving the plunger to the retracted position when the backrest is folded toward the rear frame.

11. A baby stroller according to claim 10 in which the cam is rigidly secured to one of the support links.

12. A baby stroller according to claim 11 in which the tubular member is disposed on the side of the upper frame and in which the front frame includes a side leg located immediately beneath the open end of the tubular member and substantially parallel thereto, the frame locking means being mounted on the side leg.

13. A baby stroller according to claim 10 in which the upper frame includes a handle telescopically mounted within the tubular member for movement from a retracted to an extended position.

14. A baby stroller according to claim 4 in which the upper frame includes a tubular member having an open end located adjacent the front frame when the stroller is in the erected position; and in which the frame locking means comprises a sleeve mounted on the front frame in axial registration with the open end of the tubular member and a plunger slidably mounted within the sleeve for movement from an extended position wherein it extends into the open end of the tubular member, so as to prevent pivotal movement between the front and upper frames, to a retracted position wherein it is free of the tubular member, so as to permit the front frame to fold with respect to the upper frame, and drive means connected to the plunger for moving it; said stroller being further characterized by a cam rigidly secured to the support link and adapted to engage the drive means and move the plunger to the retracted position when the backrest is folded toward the rear frame and thereby rotates the support link.

15. A baby stroller according to claim 4 and further characterized by at least one bracket mounted on the handrail and extending past the side of the backrest frame when the stroller is in the erected position, the bracket being provided with at least one aperture; said locking means comprising a pin slidably mounted on the backrest for movement from a retracted position wherein the backrest is free to fold with respect to the frames to an extended position wherein the pin engages the aperture and precludes relative movement between the backrest, handrail and frames.

16. A baby stroller according to claim 1 wherein the front and rear frames are hingedly connected to the upper frame at hinge connections which are located in spaced relation to one another.

17. A collapsible baby stroller comprising an upwardly extending upper frame, a downwardly extending front frame hingedly mounted with respect to the upper frame at its upper end, a downwardly extending rear frame hingedly mounted with respect to the upper frame at its upper end, the upper frame being hingedly mounted at it lower end with respect to the front and rear frames so that the frames can be folded from an erected position to a collapsed position wherein the frames are in substantially side-by-side relation with respect to one another, the hinge joints mounting the frames being adjacent one another so that the frames fold from a substantially common location which, when the frames are folded to their collapsed position, is located at one end of the folded stroller, wheels on the front and rear frames, frame locking means for holding the upper, front, and rear frames in the erected position at predetermined angles with respect to one another, a backrest hingedly mounted with respect to the frames, backrest locking means for releasably holding the backrest at a predetermined angle with respect to the frames, a seat hingedly mounted with respect to the backrest, and support means for holding the seat substantially horizontal when the frames are in the erected position, the backrest and seat being mounted with respect to the frames so that they are presented adjacent to and extend in substantially the same direction as the upper, front, and rear frames when those frames are in the collapsed position.

18. A baby stroller according to claim 17 wherein the frame locking means comprises at least one link-like member pivotally connected to and extending between the front and rear frames in spaced relation to the hinge connections by which the front and rear frames are hingedly mounted with respect to one another.

19. A baby stroller according to claim 18 wherein the backrest is hingedly connected to the link-like members.

20. A baby stroller comprising a frame assembly, a backrest hingedly mounted on the frame assembly for swinging movement about a stationary pivot point, a handrail assembly projecting substantially forwardly from and hingedly connected to the backrest in spaced relation to the hinge connection of the backrest and frame assembly, at least one rigid connecting link interconnecting the handrail assembly and frame assembly, the connecting link being pivotally connected to the handrail assembly at a pivot point located in spaced relation to the hinge connection of the handrail assembly and backrest and to the frame assembly about a stationary pivot point located in spaced relation to the hinge connection of the frame assembly and backrest, whereby when the angular disposition of the backrest is altered, the handrail will shift generally horizontally and the connecting link will rotate about the stationary pivot point, and locking means on the backrest for releasably engaging the handrail assembly in spaced relation to the hinge connection of the backrest and handrail assembly, whereby the backrest can be held in fixed and determined relation with respect to the frame assembly.

21. A baby stroller according to claim 20 wherein the locking means engages the handrail assembly at any one of a plurality of locations whereby the backrest can be held in a plurality of selected locations.

22. A baby stroller according to claim 21 wherein the locking means comprises locking pins shiftably mounted on the backrest for extension into and retraction from apertures in the handrail assembly.

References Cited

UNITED STATES PATENTS

| | | | |
|---|---|---|---|
| 2,615,725 | 10/1952 | Person | 280—41 |
| 3,084,949 | 4/1963 | Forster et al. | 280—36 |
| 3,222,081 | 12/1965 | Harmon | 280—36 |
| 3,326,570 | 6/1967 | Burnham et al. | 280—36 |

BENJAMIN HERSH, *Primary Examiner.*

J. SIEGEL, *Assistant Examiner.*

U.S. Cl. X.R.

297—34

UNITED STATES PATENT OFFICE
CERTIFICATE OF CORRECTION

Patent No. 3,421,774                                                                      January 14, 1969

David D. Patterson

It is certified that error appears in the above identified patent and that said Letters Patent are hereby corrected as shown below:

Column 5, line 1, "urger" should read -- urge --. Column 6, line 30, "secured legs" should read -- secured to legs --. Column 7, line 3, "into a close" should read -- into close --. Column 9, line 38, "space" should read -- spaced --. Column 13, line 60, the claim reference numeral "12" should read -- 6 --.

Signed and sealed this 17th day of March 1970.

(SEAL)
Attest:

Edward M. Fletcher, Jr.                                    WILLIAM E. SCHUYLER, JR.
Attesting Officer                                                  Commissioner of Patents